Sept. 6, 1927. 1,641,796
C. W. AUE
PRESSURE OPERATED SWITCH FOR TIRE METERS
Filed March 13, 1926
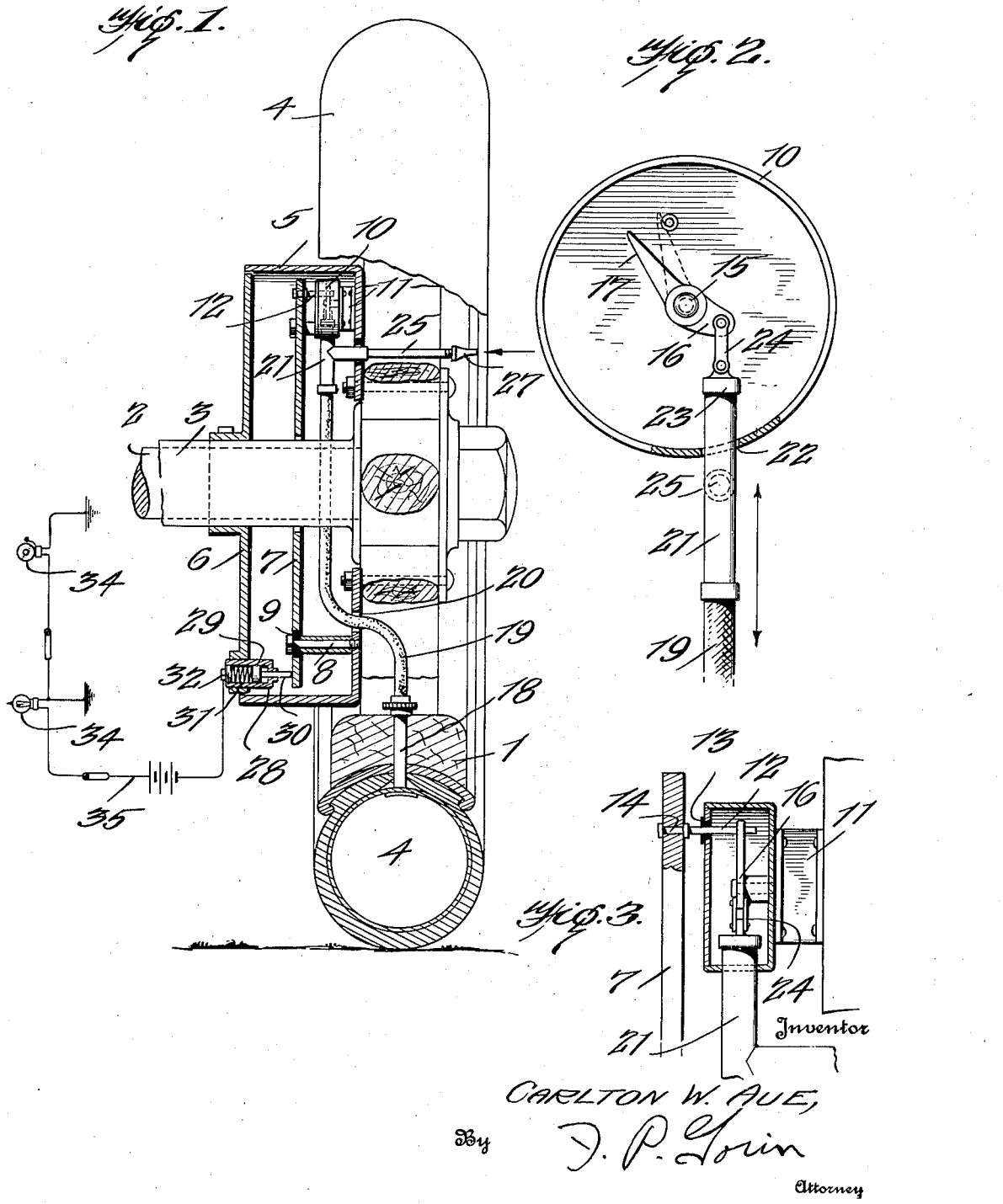
Inventor
CARLTON W. AUE,
By J. P. Lorin
Attorney Patented Sept. 6, 1927.

1,641,796

UNITED STATES PATENT OFFICE.

CARLTON W. AUE, OF SNOQUALMIE FALLS, WASHINGTON.

PRESSURE-OPERATED SWITCH FOR TIRE METERS.

Application filed March 13, 1926. Serial No. 94,550.

This invention relates to an improvement in automatic alarms for pneumatic tires, wherein any decrease in tire pressure is automatically indicated to advise the driver as to the condition of the particular tire or tires.

The tire alarm is arranged to permit inflation of the tire at will, and by such inflation control a switch element, which under deflation of the tire closes the circuit to thereby sound an alarm either visual or audible to indicate such tire deflation.

The invention in its application to the rear wheels constitutes a construction disposed within the usual brake drum, with the switch element operated directly by the pressure within the tire, and sensitively responsive to that pressure to permit any appreciable variation in tire pressure to so control the switch element that the driver will be advised first of the gradually decreasing pressure in the tire, and secondly, as to a pressure decrease which necessitates the immediate recharging of the tires.

The invention is illustrated in the accompanying drawings, in which:

Fig. 1 is a view in vertical section, partly in elevation, showing the application of the tire alarm to the rear wheel of an automobile.

Fig. 2 is an enlarged vertical section through the switch casing.

Fig. 3 is a transverse section through the same.

In order to illustrate the application of the improved tire alarm, I have shown the same applied to a rear wheel 1, supported upon an axle 2, mounted in a housing 3 and having the usual pneumatic tire 4. The wheel is provided with the usual brake drum 5 which is of course secured to and rotates with the wheel, the open inner end of which is closed by a plate 6 secured to and carried by the housing 3, all of which parts are conventional.

The improved tire alarm includes a disc 7, which through the medium of bolts 8, is secured to the brake drum 5 and disposed within the same, and as indicated at 9, the disc 7 is insulated from the brake drum. A cylindrical switch case 10 is secured to the brake drum at 11, adjacent the peripheral edge of the disc 7 and arranged in this casing is a contact post 12 insulated at 13 from the casing and extending through the same and connected at 14 to the disc 7. Pivotally supported centrally of the switch disc 10 as at 15, is a switch arm 16, one terminal 17 of which is adapted in a predetermined movement about its pivot 15 to make electrical contact with the pin 12.

The usual valve 18, from which the valve parts have been removed, is connected through a flexible tube 19, which extends within the brake drum at 20 to a rigid portion 21, which extends through one wall of the switch casing 10 as at 22, and has its closed end 23 connected by a link 24 with one end of the switch arm 16. A member 25 similar to the ordinary valve stem, is connected through a flexile section 26 with the section 21 of the tube 19, this auxiliary valve stem 25 extending between the spokes of the wheel and having the usual closing cap 27. Secured in and insulated from the closing plate 6 of the brake drum is a nipple 28, in which is disposed a plunger 29 having its projecting rod portion 30 bearing against the disc 7 under pressure of a spring 31 arranged in the nipple and held by a plug 32.

An alarm, such as a light 33, or audible signal 34, is connected through the medium of a conductor 35, with the plug 32, the opposite sides of these alarm signals being grounded to the frame of the automobile in the usual manner of automobile connections.

In use, the tire is inflated through the auxiliary valve stem 25, and under the pressure of the air, the tendency of the flexible tube 19 is to straighten. This tends to move the section 21 of the tube 19 upwardly in the valve casing 10 and thereby deflect the terminal 17 of the switch arm away from the contact 12. Thus with the tire properly inflated, the switch arm terminal 17 is spaced from the contact 12 and the circuit through the alarm is incomplete. Upon deflation of the tire however, a corresponding decrease of the pressure in tube 19 causes a reverse movement of the section 21, with the effect to cause the terminal 17 of the switch arm to approach the contact 12. With the tire softened through partial deflation, the change in pressure incident to the travel of the wheel causes the section 21 to move inwardly and outwardly and thereby cause a momentary engagement with the contact 12. This as will be obvious completes the circuit, and the alarm either visible or audible, is intermittently energized. The driver is thus advised that the pressure in his tire is gradually being lowered. If attention is not given to the tire at this time and the deflation continues to the predetermined point, the terminal 17 will eventually engage the contact 12 and remain in engagement therewith. This will maintain a completion of the electrical circuit and the audible or visible alarm will continue uninterrupted to indicate the fact that the pressure of the tire has been depleted to a point requiring immediate attention.

It is of course to be understood that the improved alarm will be applied to each of the four wheels so that the driver will be able to determine which tire is being depleted and requires attention.

What I claim is:

1. In a pressure operated switch for tire meters, a rotating disk moving with the wheel, a spring pressed contact at all times engaging the disk, a second contact projecting from the disk, a lever connected to the other side of the circuit and movable into and out of engaging relation with the second contact, and means responsive to the pressure within the tire to operate the lever.

2. In a pressure operated switch for tire meters, a rotating disk moving with the wheel, a spring pressed contact at all times engaging the disk, a second contact projecting from the disk, a lever connected to the other side of the circuit and movable into and out of engaging relation with the second contact, means responsive to the pressure within the tire to operate the lever, a nipple whereby air may be introduced into the tire, and a communication between said nipple and said means to cause the means to respond to the pressure of air being introduced into the tire.

In testimony whereof I affix my signature.

CARLTON W. AUE.